United States Patent
Chen et al.

(10) Patent No.: US 7,441,728 B2
(45) Date of Patent: Oct. 28, 2008

(54) MOUNTING APPARATUS FOR INDICATOR DEVICE

(75) Inventors: Yun-Lung Chen, Taipei Hsien (TW); Qing-Hao Wu, Shenzhen (CN)

(73) Assignees: Hong Fu Jin Precision Industry (ShenZhen) Co., Ltd., Shenzhen, Guanghong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/695,063

(22) Filed: Apr. 2, 2007

(65) Prior Publication Data

US 2008/0135690 A1    Jun. 12, 2008

(30) Foreign Application Priority Data

Dec. 6, 2006    (CN)    .................. 2006 2 0016221

(51) Int. Cl.
    *G12B 9/00*    (2006.01)
(52) U.S. Cl. .................. 248/27.1; 248/27.3; 362/457
(58) Field of Classification Search .............. 248/27.1, 248/27.2, 201, 71; 362/396, 457; 439/226, 439/488, 489, 490
    See application file for complete search history.

(56) References Cited

U.S. PATENT DOCUMENTS

| | | | | |
|---|---|---|---|---|
| 3,168,612 A | * | 2/1965 | Sorensen | 174/57 |
| 5,238,427 A | * | 8/1993 | Fry et al. | 439/557 |
| 5,338,211 A | * | 8/1994 | Kodama et al. | 439/135 |
| 5,343,006 A | * | 8/1994 | Moffett | 200/296 |
| 6,109,955 A | * | 8/2000 | Hanazaki et al. | 439/489 |
| 6,360,999 B1 | | 3/2002 | Liao | |
| 6,502,958 B1 | * | 1/2003 | Chen | 362/252 |
| 2001/0002018 A1 | * | 5/2001 | Goudal | 220/3.5 |
| 2006/0286854 A1 | * | 12/2006 | Kuo | 439/490 |

* cited by examiner

*Primary Examiner*—Ramon O Ramirez
(74) *Attorney, Agent, or Firm*—Frank R. Niranjan

(57) ABSTRACT

A mounting apparatus for mounting an indicator device to a computer, includes a first securing bracket (10) and a second securing bracket (30) detachably attached to the computer. The first securing bracket includes a pair of side walls (12). A recess (19) is formed on each side wall. A securing slot (191) is disposed next to each recess. The second securing bracket includes a pair of side walls (32). A fixing plate (39) extends laterally from each side wall of the second securing bracket corresponding to each recess of the first securing bracket. A hook portion (391) is disposed on a free end of each fixing plate for clasping the corresponding securing slot. The side walls of the first and second securing brackets are correspondingly coplanar when the first and second securing brackets are secured together. The first securing bracket and the second securing bracket cooperatively define an accommodating space for receiving the indicator device therein.

12 Claims, 5 Drawing Sheets

MOUNTING APPARATUS FOR INDICATOR DEVICE

BACKGROUND OF THE INVENTION

1. Field of the Invention

The present invention relates to mounting apparatuses, and more particularly to a mounting apparatus for an indicator device of a computer.

2. Description of Related Art

A plurality of indicator devices are usually mounted on a front panel of a computer enclosure for indicating different running states of the computer. These indicator devices can be used to show if power is on or off, read/write operations of drives, idle state, and so on.

In a typical computer enclosure, the indicator devices are light emitting diodes (LED) which are mounted on directly on a panel. For example, a device for retaining an LED indicator on a computer enclosure includes a hole defined in a panel of the enclosure for receiving the LED indicator therein. The hole has a circumferential edge along which a perpendicular flange is formed for surface contacting and thus securely retaining the LED indicator. Two radially extending slits are defined in the panel in communication with the hole thereby forming a resilient tab therebetween. A nominal diameter of the hole is substantially corresponding to or slightly smaller than a diameter of the LED indicator whereby when the LED indicator is inserted into the hole, the resilient tab is deflected and thus applies a biasing force to the LED indicator for securely retaining the LED indicator. However, because the LED indicator is fragile, it is easy to damage the LED indicator when the LED indicator is inserted into the hole.

What is needed, therefore, is a mounting apparatus with a simple structure for convenient installation and removal of an indicator device of a computer.

SUMMARY OF THE INVENTION

A mounting apparatus for an indicator device includes a first securing bracket and a second securing bracket. The first securing bracket includes a pair of side walls. A recess is formed on each side wall. A securing slot is disposed next to each recess. The second securing bracket includes a pair of side walls. A fixing plate extends laterally from each side wall of the second securing bracket corresponding to each recess of the first securing bracket. A hook portion is disposed on a free end of each fixing plate of the second securing bracket for clasping the corresponding securing slot. The second securing bracket is coupled to the first securing bracket. The fixing plates are received in the respective recesses with the hook portions engaging in the corresponding securing slots. The side walls of the first securing bracket are coplanar with the corresponding side walls of the second securing bracket. The first securing bracket and the second securing bracket cooperatively define an accommodating space for receiving the indicator device therein.

Other advantages and novel features of the present invention will become more apparent from the following detailed description of a preferred embodiment when taken in conjunction with the accompanying drawings, in which:

DETAILED DESCRIPTION OF THE INVENTION

Figure 1:
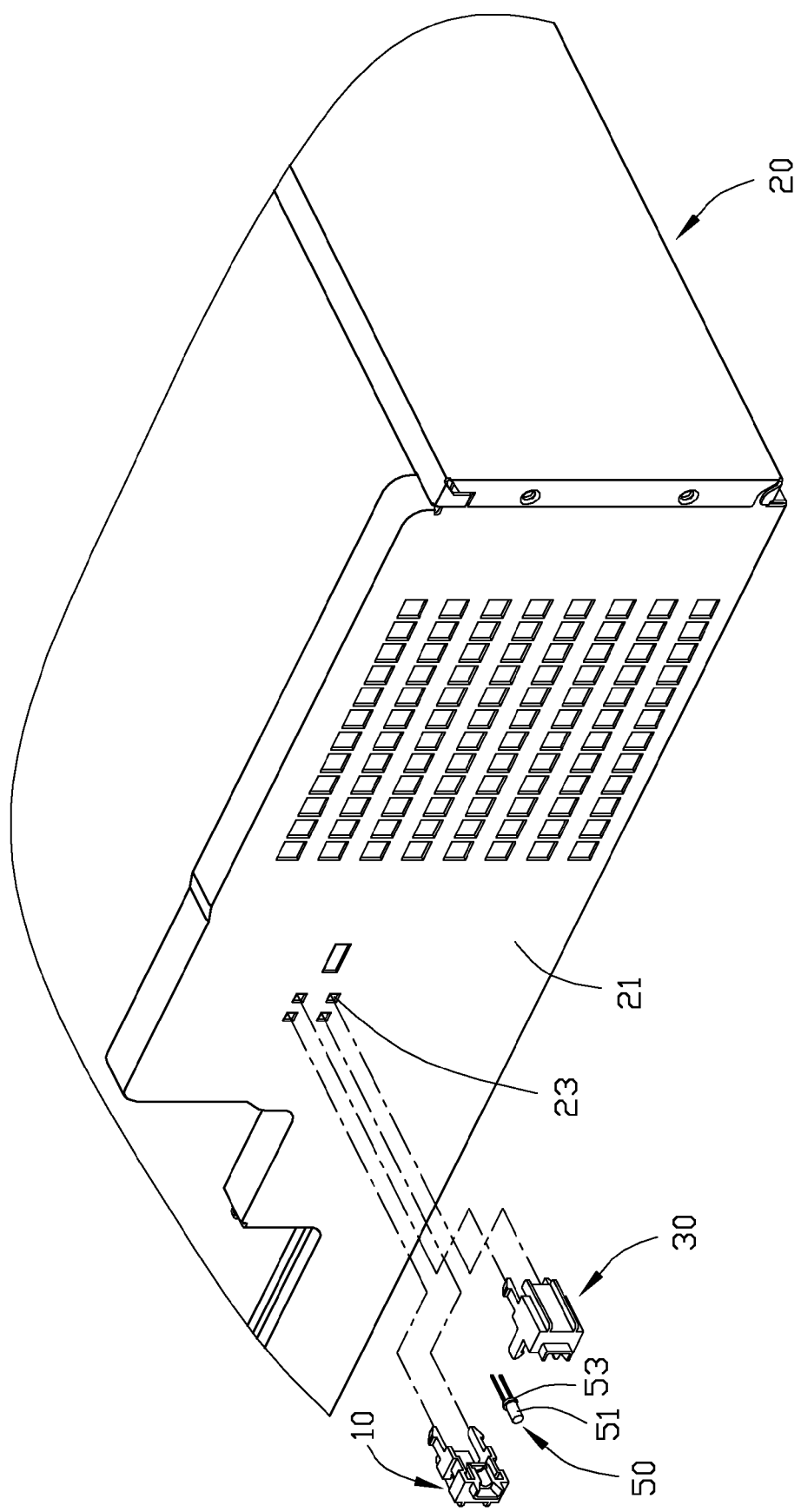
FIG. 1 is an exploded, isometric view of a computer enclosure, an indicator device and a mounting apparatus of a preferred embodiment of the present invention including a first securing bracket and a second securing bracket.

Referring to FIG. 1, a mounting apparatus of a preferred embodiment of the present invention includes a first securing bracket 10 and a second securing bracket 30 being configured for securing an indicator device on a computer enclosure 20. The indicator device acts as indicating different operating states of a computer. In this exemplary embodiment, the indicator device is an LED lamp 50, which includes a cylindrical body 51 and a circumferential base 53 formed on one end of the body 51. A cross section of the base 53 is larger than a cross section of the body 51. The computer enclosure 20 includes a front panel 21. The front panel 21 defines four mounting holes 23 in a center portion thereof for securing the first securing bracket 10 and the second securing bracket 30 thereon.

Figure 2:
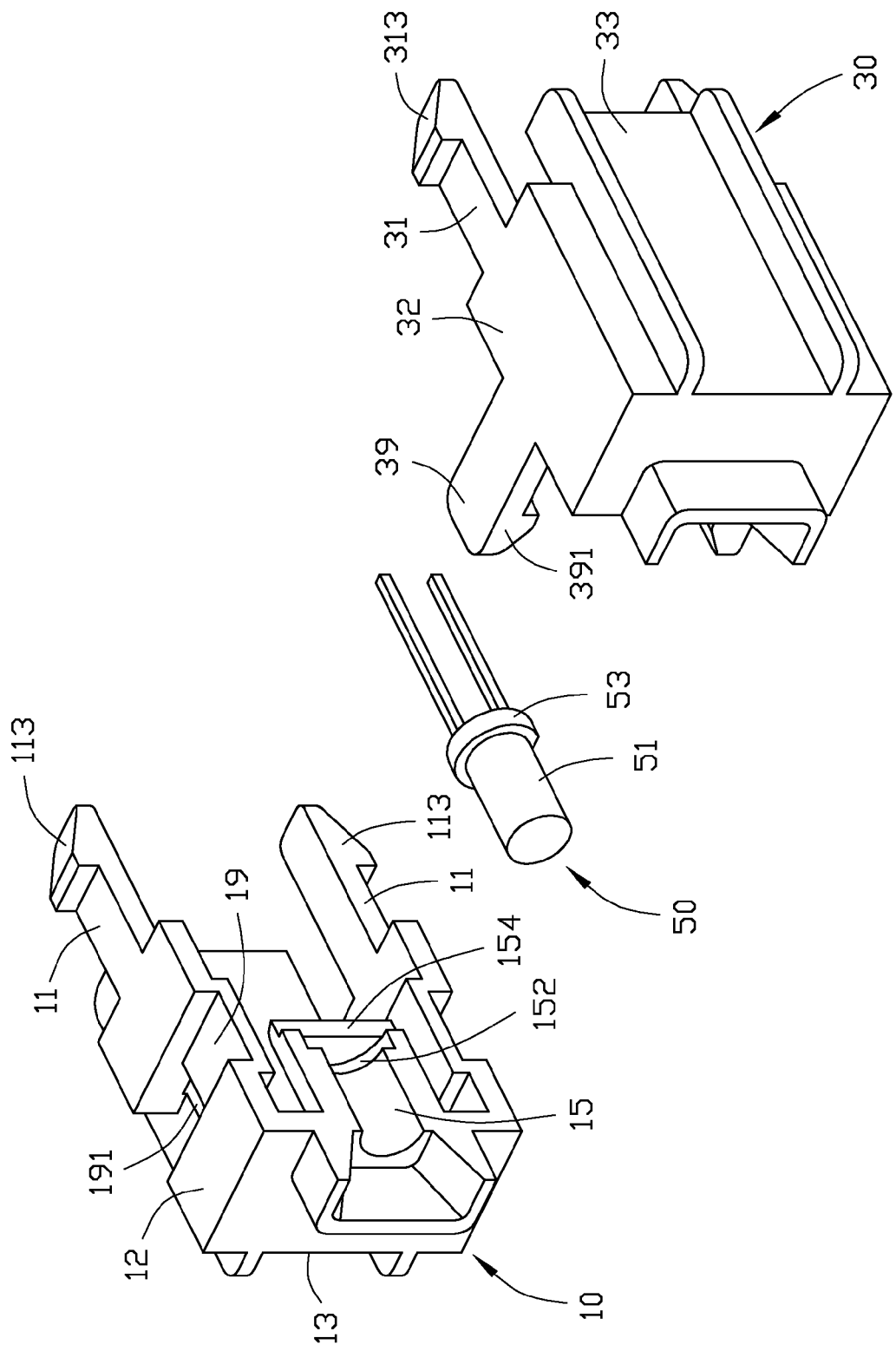
FIG. 2 is an isometric view of the first securing bracket, the indicator device, and the second securing bracket.

Referring to FIG. 2, the first securing bracket 10 includes a first side wall 13, and a pair of second side walls 12 perpendicularly bent inward from opposite edges of the first side wall 13. A resilient cantilever 11 extends outward from one end of each second side wall 12. Each resilient cantilever 11 includes a barb 113 protruding from a free end thereof. Each second side wall 12 defines a recess 19 in a center of the outer surface thereof. A securing slot 191 is defined in each second side wall 12 next to each recess 19. A pair of parallel ridges (not labeled) is formed on the first side wall 13 for abutting against the front panel 21 of the computer enclosure 20. A first positioning portion 15 is formed between two second side walls 12, corresponding to the body 51 and the base 53 of the lamp 50. In this exemplary embodiment, the first positioning portion 15 is in a shape of a hollow half cylinder configured for snugly receiving a portion of the lamp 50 for embracing the lamp 50 therein. A semicircular slot 152 corresponding to the base 53 is defined in an inner surface of the first positioning portion 15. A stop plate 154 is formed at an end of the first positioning portion 15 adjacent the slot 152.

Figure 3:
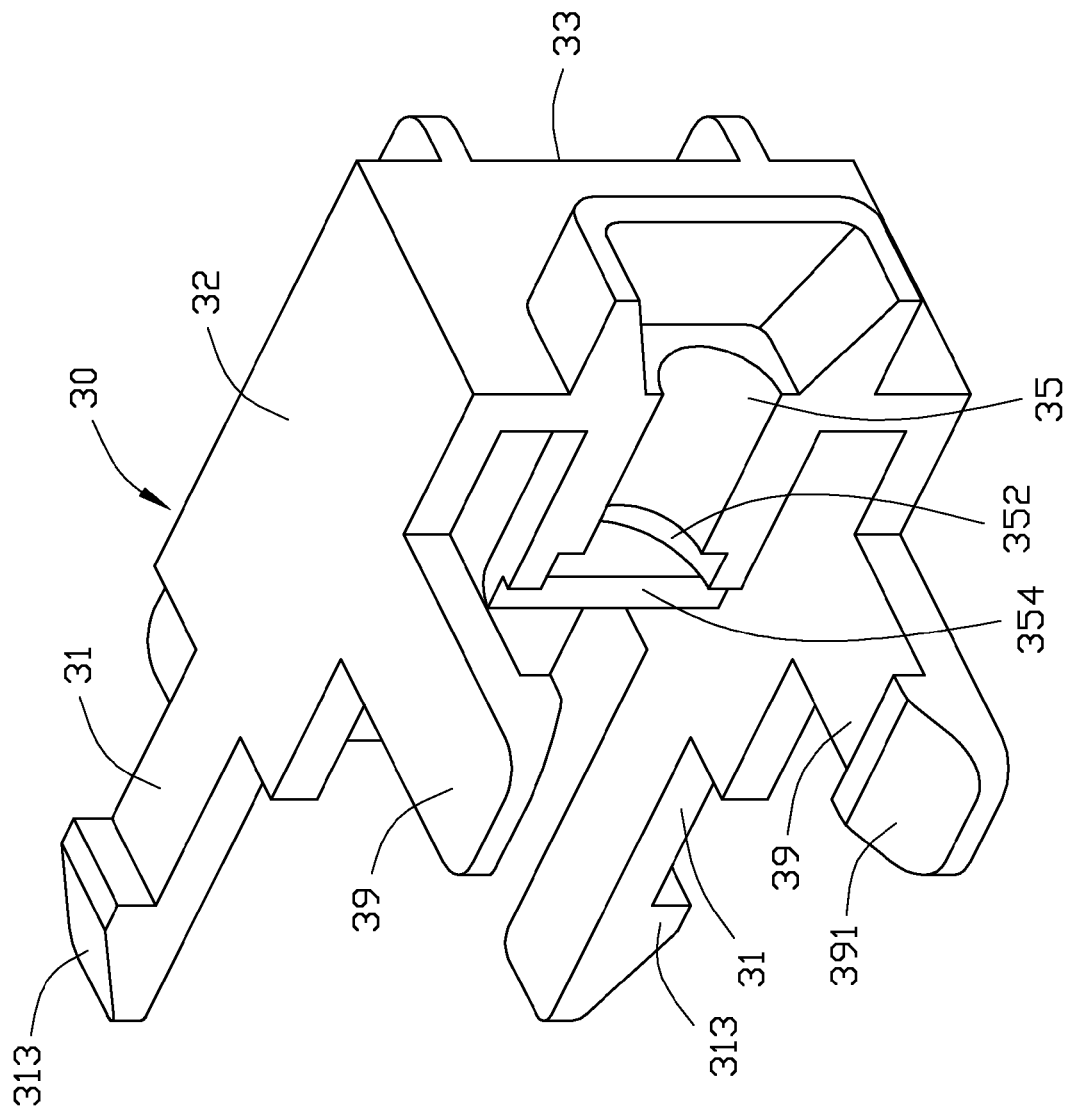
FIG. 3 is an enlarged, isometric view of the second securing bracket, but viewed from another aspect.

Referring to FIGS. 2 and 3, the second securing bracket 30 includes a first side wall 33, and a pair of second side walls 32 are perpendicularly bent laterally from opposite edges of the first side wall 33. The second side walls 32 are coplanar with the corresponding second side walls 12 of the first securing bracket 10 when the second securing bracket 30 is attached to the first securing bracket 10. A resilient cantilever 31 extends from one end of each second side wall 32 respectively. Each resilient cantilever 31 includes a barb 313 protruding from a free end of each resilient cantilever 31. A fixing plate 39 extends laterally from a side edge of each second side wall 32 corresponding to the recesses 19 of the first securing bracket 10 to be fully received therein. A hook portion 391 is formed at a free end of each fixing plate 39, configured to engaging in the corresponding securing slots 191. A pair of parallel ridges (not labeled) is formed on the first side wall 33 for abutting against the front panel 21 of the computer enclosure 20. A second positioning portion 35 is formed between two second side walls 32 symmetrically opposite to the first positioning portion 15 of the first securing bracket 10, corresponding to the body 51 and the base 53 of the lamp 50. A semicircular slot 352 corresponding to the base 53 is defined in an inner surface of the second positioning portion 35. A stop plate 354 is formed at an end of the second positioning portion 35 adjacent the slot 352. The positioning portions 15, 35 cooperatively define an accommodating space, configured to tightly receive the body 51 and the base 53 of the lamp 50. The shape of the accommodating space fits with part of the lamp 50 for securing the lamp 50 therein.

Figure 4:
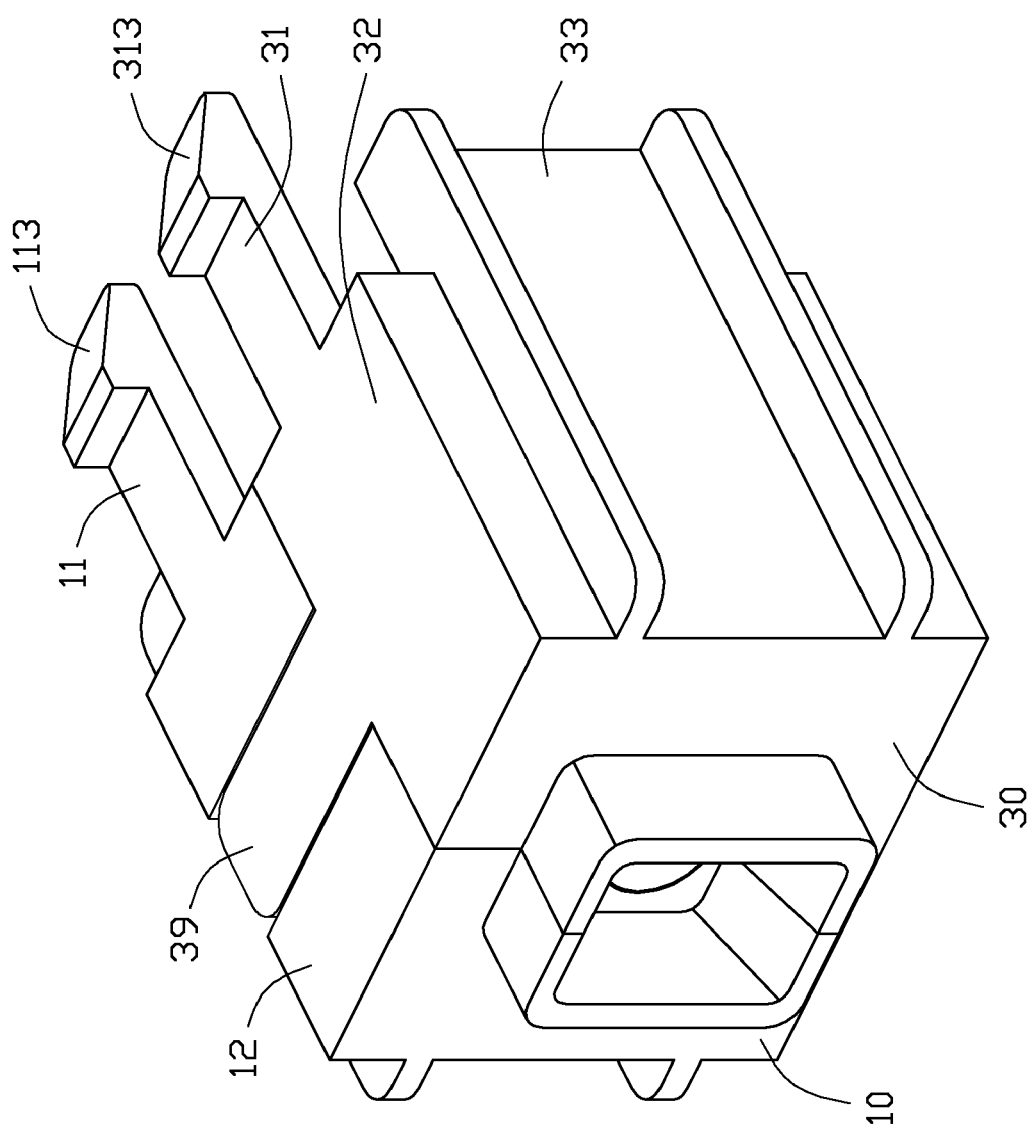
FIG. 4 is an assembled view of FIG. 2.

Referring also to FIG. 4, in assembly, the body 51 and the base 53 of the lamp 50 is placed in the first positioning portion 15 of the first securing bracket 30. The fixing plates 39 and the hook portions 391 of the second securing bracket 30 are moved towards the recesses 19 and the securing slots 191 of the first securing bracket 10. The fixing plates 39 are firmly received in the corresponding recesses 19 when the hook portions 391 are engaged in the corresponding securing slots 191. The semicircular slots 152, 352 cooperatively form a circular slot configured for receiving the base 53 of the lamp 50. The stop plate 154 of the first positioning portion 15 faces the stop plate 354 of the second positioning portion 15 with a gap formed therebetween. The body 51 and the base 53 of the lamp 50 are received in the accommodating space cooperatively defined by the positioning portions 15, 35. The base 53 are received in the circular slot cooperatively defined by the semicircular slots 152, 352 to thereby position the lamp 50 in an axial direction thereof. The pins of the lamp 50 extend through the gap formed between the stop plates 154, 354. The lamp 50 is stably fixed between the first securing bracket 10 and the second securing bracket 30. When it is desired to remove the lamp 50, the hook portions 391 of the second securing bracket 30 are urged up to disengage the fixing plates 39 from the first securing bracket 10, thereby the second securing bracket 30 is detached from the first securing bracket 10. Thus, the lamp 50 can be removed from the first securing bracket 10 and the second securing bracket 30.

Figure 5:
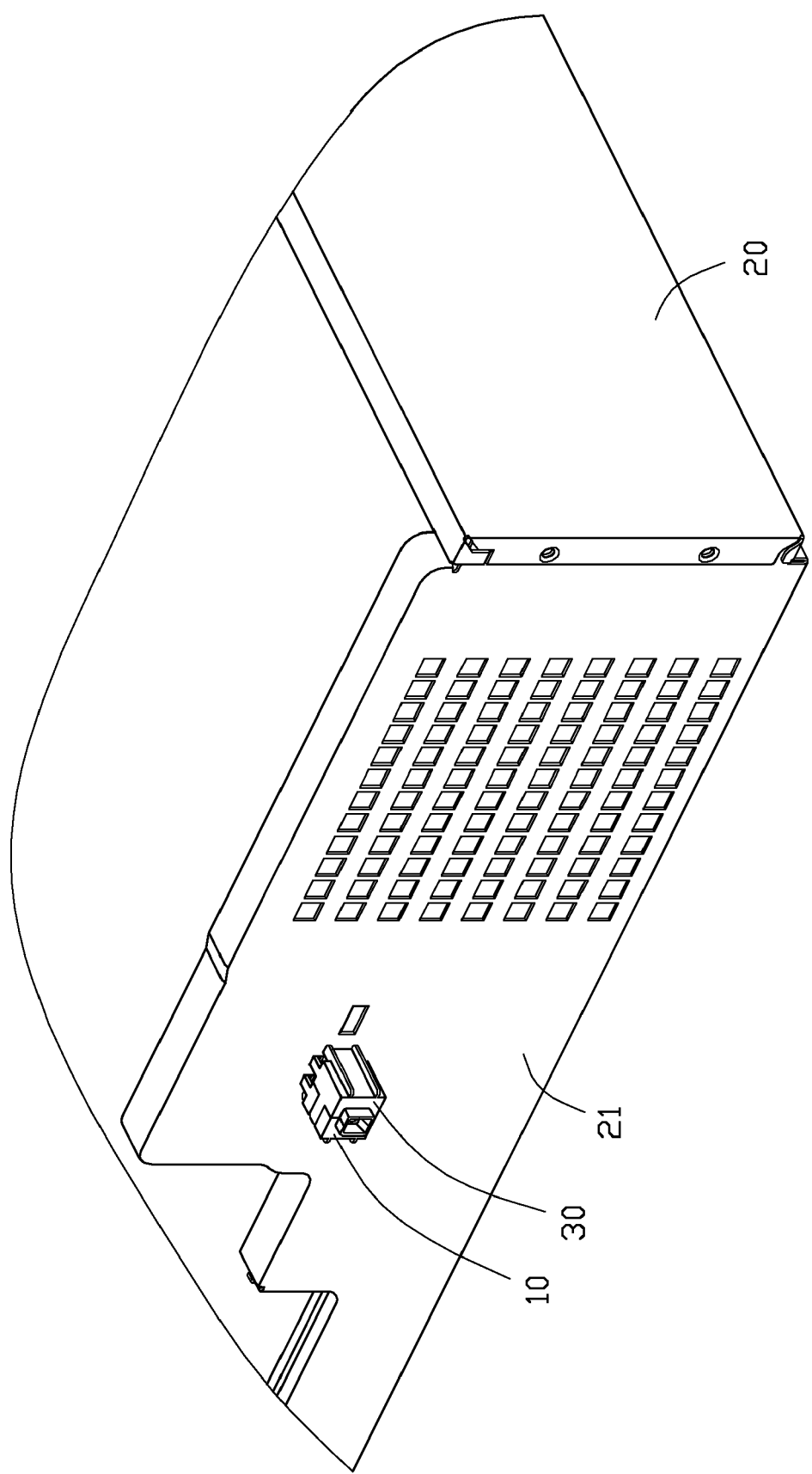
FIG. 5 is an assembled view of FIG. 1.

Referring also to FIG. 5, the combined first securing bracket 10, the second securing bracket 30, and the lamp 50 sandwiched between the first and second securing brackets 10, 30 are fixed on the front panel 21 of the computer enclosure 20. The resilient cantilevers 11, 31 of the first securing bracket 10 and the second securing bracket 30 are inserted into the corresponding mounting holes 23. The barbs 113, 313 of the resilient cantilevers 11, 31 clasp an inner surface of the front panel 21 adjacent the corresponding mounting holes 23, whereby the first securing bracket 10 and the second securing bracket 30 are secured on the front panel 21. The lamp 50 is thus stably secured on the computer enclosure 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for an indicator device, comprising:
   a first securing bracket comprising a pair of side walls, a recess being formed on each side wall, a securing slot being disposed next to each recess; and
   a second securing bracket comprising a pair of side walls, a fixing plate extending laterally from each side wall of the second securing bracket corresponding to each recess of the first securing bracket, a hook portion disposed on a free end of each fixing plate configured for clasping the corresponding securing slot, a resilient cantilever extending outward from each side wall of the first securing bracket and the second securing bracket respectively, a barb being formed on a free end of each resilient cantilever for securing on a computer enclosure;
   wherein when the second securing bracket is coupled to the first securing bracket, the fixing plates are received in the recesses respectively with the hook portions engaging in the corresponding securing slots, the first securing bracket and the second securing bracket cooperatively defining an accommodating space for receiving the indicator device therein.

2. The mounting apparatus as described in claim 1, wherein the shape of the accommodating space fits with part of the indicator device for securing the indicator device therein.

3. The mounting apparatus as described in claim 1, wherein a first positioning portion is formed between the side walls of the first securing bracket, a second positioning portion is formed between the side walls of the second securing bracket symmetrically opposite to the first positioning portion of the first securing bracket.

4. The mounting apparatus as described in claim 3, wherein the accommodating space is cooperatively defined by the first positioning portion and the second positioning portion.

5. The mounting apparatus as described in claim 1, wherein the first securing bracket and the second securing bracket each comprises another side wall, a pair of parallel ridges is formed on each another side wall configured for abutting against the computer enclosure, and the side walls being bent from opposite edges of a corresponding one of said another side walls of the first securing bracket and the second securing bracket.

6. The mounting apparatus as described in claim 1, wherein when the second securing bracket is coupled to the first securing bracket the side walls of the first securing bracket is coplanar with the corresponding side walls of the second securing bracket.

7. A mounting apparatus mounting an indicator device to a panel of a computer, the panel defining a plurality of holes, the mounting apparatus comprising:
   a first securing bracket comprising a pair of side walls, a first positioning portion and an elastic latch detachably hooked with the panel of the computer;
   a second securing bracket comprising a pair of side walls detachably engaging with the side walls of the first securing bracket, a second positioning portion facing the first positioning portion, and an elastic latch detachably hooked with the panel of the computer; and
   a space being formed between the first and second positioning portions to receive the indicator device therein before the second securing bracket is engaged with the first securing bracket, the space having an open end for exposing the indicator device.

8. The mounting apparatus as claimed in claim 7, wherein each of the side walls of the first securing bracket defines a slot, and each of the side walls of the second securing bracket forms a hook portion detachably engaged in a corresponding one of the slots.

9. The mounting apparatus as claimed in claim 8, wherein each of the side walls of the first securing bracket further defines a recess, and each of the side walls of the second securing bracket forms a fixing plate extending laterally therefrom and received in the recess, the hook portion being formed at a distal end of the fixing plate.

10. The mounting apparatus as claimed in claim 7, wherein each of the first and second positioning portions defines a half cylindrical void and a semicircular slot, the half cylindrical voids of the first and second positioning portions cooperatively form a cylindrical void receiving a cylindrical body of the indicator device, and the semicircular slots cooperatively form a circular slot receiving an annular protrusive base of the indicator device.

11. The mounting apparatus as claimed in claim 10, wherein each of the first and second positioning portions forms a stop plate communicating the semicircular slot and abutting against the base of the indicator device.

12. The mounting apparatus as claimed in claim 7, wherein each of the first and second securing brackets forms a stop structure abutting against the panel of the computer in a direction perpendicular to the panel.

\* \* \* \* \*